United States Patent [19]

Hedman et al.

[11] Patent Number: 5,184,673
[45] Date of Patent: Feb. 9, 1993

[54] PLATE HEAT EXCHANGER AND METHOD FOR ITS MANUFACTURE

[75] Inventors: Erik Hedman, Linköping; Rolf Hedman, Motala, both of Sweden

[73] Assignee: Torell AB, Linkoping, Sweden

[21] Appl. No.: 761,816

[22] PCT Filed: Mar. 7, 1990

[86] PCT No.: PCT/SE90/00144
§ 371 Date: Sep. 20, 1991
§ 102(e) Date: Sep. 20, 1991

[87] PCT Pub. No.: WO90/13394
PCT Pub. Date: Nov. 15, 1990

[51] Int. Cl.$^5$ .............................. F28D 1/03
[52] U.S. Cl. .................... 165/153; 165/78; 29/890.039; 228/183
[58] Field of Search ............ 165/78, 153, 167; 228/136, 183; 29/890.039, 727

[56] References Cited

U.S. PATENT DOCUMENTS

| | | | |
|---|---|---|---|
| 3,451,114 | 6/1969 | Werneke | 228/183 |
| 3,805,889 | 4/1974 | Coolidge | 165/153 |
| 4,211,278 | 7/1980 | Bennett et al. | 165/130 |
| 4,484,622 | 11/1984 | Satchwell | 165/153 |

FOREIGN PATENT DOCUMENTS

| | | | |
|---|---|---|---|
| 232231 | 8/1987 | European Pat. Off. | 165/167 |
| C-122393 | 12/1900 | Fed. Rep. of Germany . | |
| C-689873 | 3/1940 | Fed. Rep. of Germany . | |
| B2-1172828 | 6/1964 | Fed. Rep. of Germany . | |
| A1-1452552 | 4/1965 | Fed. Rep. of Germany . | |
| 3500571 | 11/1985 | Fed. Rep. of Germany | 165/153 |
| 3544921 | 7/1987 | Fed. Rep. of Germany | 165/153 |
| A1-2280871 | 2/1976 | France . | |
| 62-13995 | 1/1987 | Japan . | |
| 921446 | 3/1963 | United Kingdom | 165/153 |

OTHER PUBLICATIONS

Patent Abstracts of Japan, vol. 11, No. 188 (M-599), abstract of JP-A-62-13995.

Primary Examiner—Allen J. Flanigan
Attorney, Agent, or Firm—Baker & Daniels

[57] ABSTRACT

The invention relates to a method for the manufacture of a plate heat exchanger/cooler (1), and to an arrangement for a plate heat exchanger/cooler produced by furnace brazing. When finished, the heat exchanger exhibits a number of passageways (2-7) communicating in parallel via collectors (8a) and intended for a fluid which is cooled. Each of the passageways (2-7) consists of a pair of plates (2a, 2b, ... 7a, 7b) facing one another. These have openings (2a2, 2b2, ... 7a2, 7b2) arranged on the ends which, in the finished heat exchanger/cooler, constitute the aforementioned collectors (8a). Spacer washers (10) which define flow openings (10a) for a cooling medium are present between pairs of plates situated adjacent one another. The spacer washers (10) and the plates (2a, 2b, ... 7a, 7b) and the pairs of plates are joined together at least along their outward-folded edges (2a1, 2b1, ... 7a1, 7b1) by a furnace brazing process. In each passageway (2-7), a space washer (10) and a distance piece (11) are placed in an area on each end before the plates (2a, 2b, ... 7a, 7b) are brought into edge-to-edge contact with one another. The plates and spacer washers/distance pieces (10;11) are caused by the furnace brazing process to form a solid body (12) on each short side of the heat exchanger/cooler (1). Before or after the furnace brazing process at least one transvers channel (9) for the installation of the heat exchanger cooler (1) is made through each such solid body (12).

11 Claims, 3 Drawing Sheets

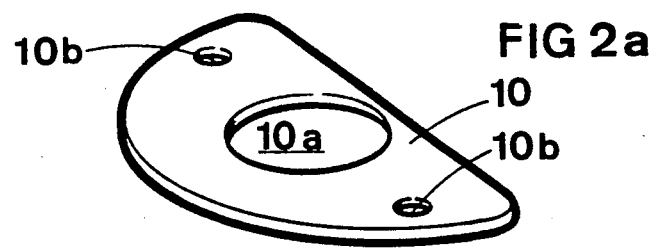
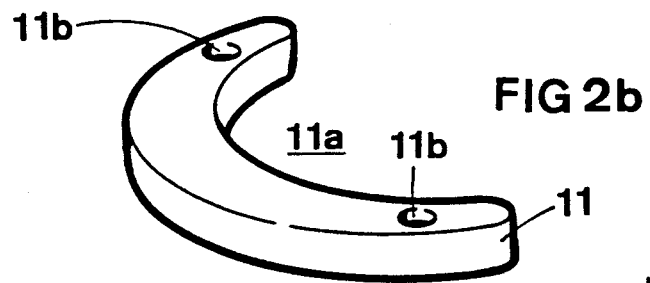
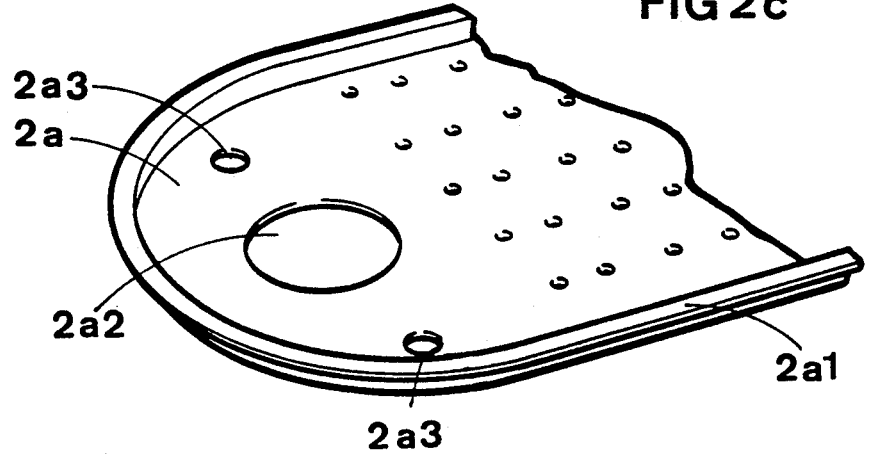
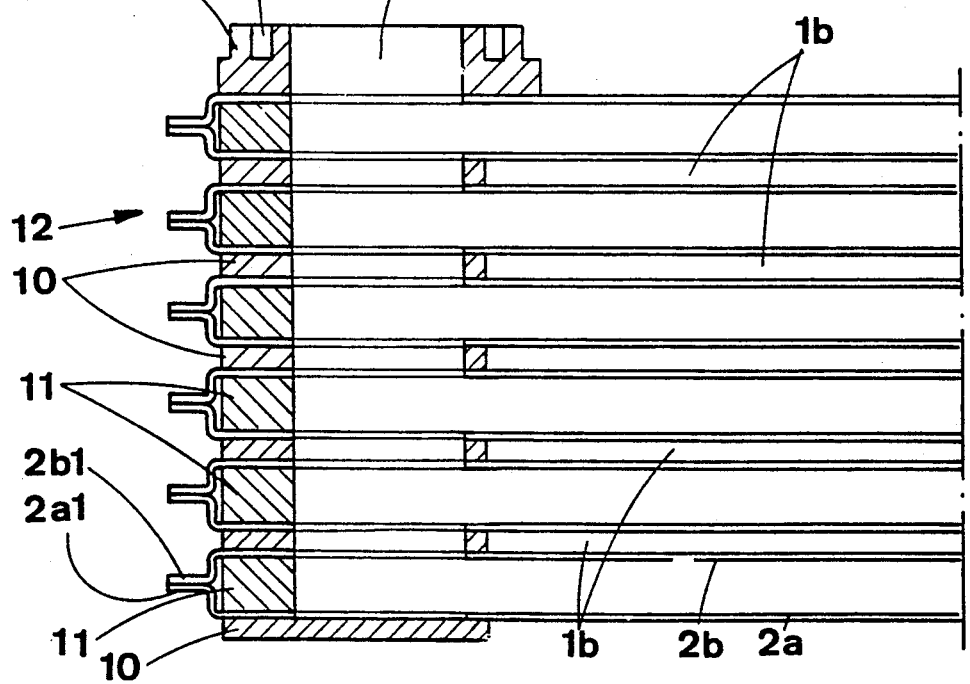

PLATE HEAT EXCHANGER AND METHOD FOR ITS MANUFACTURE

The present invention relates to a method for the manufacture of a plate heat exchanger/cooler, which, in its finished state, exhibits a number of passageways communicating in parallel via collectors and intended for a fluid which is to be cooled, each and every one of which passageways consists of a pair of preferably rounded, rectangular plates executed with projecting and outward-folded edges and facing one another, with openings arranged on the short sides, which, in the finished heat exchanger/cooler, constitute the aforementioned collectors, in conjunction with which, on the one hand, spacer washers which define slotted flow openings for a cooling medium are present between pairs of plates situated adjacent to one another and, on the other hand, a distance piece is present between each pair of plates in an area on the respective short side, whereby the spacer washers and the plates and the pairs of plates are joined together at least along their outward-folded edges by a furnace brazing process.

For the sake of simplicity the expression cooler is used below for both heat exchanger and cooler.

For the purposes of the installation of previously disclosed coolers of the aforementioned kind, they are provided with fastening devices, often in the form of fastening lugs or similar. These are usually attached to one of the outer plates of the cooler or take the form of projecting parts of the connection sleeves of the cooler. In order to be able to install the cooler in conjunction with a system of which it is a part, coolers of the previously disclosed kind require the fastening lugs to project beyond the cooler. This means that the cooler takes up a comparatively large amount of space, due to the fact that more space is required than that which is needed by the actual cooler. This previously disclosed type of installation is also not ideal from the point of view of its strength, since vibrations can give rise to fatigue damage, inter alia at the point of attachment of the fastening lugs to the cooler.

A primary object of the present invention is to make available a method for the manufacture of a cooler which, for the purposes of its installation, takes up less space than previously disclosed coolers. This is achieved through the invention, in that the spacer washers and the distance pieces are positioned in the same area, in that the aforementioned plates and spacer washers/distance pieces are caused during the furnace brazing operation to form a solid body on the respective short side of the plate heat exchanger/cooler, and in that before or after the furnace brazing operation at least one channel running across the plates and through these and the space washers/distance pieces is produced in the aforementioned area, which channel is intended to be utilized in conjunction with the installation of the heat exchanger/cooler.

A cooler which is also considerably more resistant to vibration than previously disclosed coolers is obtained via the method of manufacture in accordance with the invention.

The arrangement of spacers between the plates in dismantlable radiators made of relatively thin plate is previously disclosed through, for example, patent specification DE 122 393, patent application for public inspection DE 1 172 828 and patent application FR 74 26 763. These spacers are arranged in areas where the plates are exposed to stresses from clamping braces by means of which the component parts of the radiator are held together. The spacers thus serve the purpose of relieving the stress on the radiator plates and of increasing the rigidity of the radiator. The aforementioned publications do not reveal the presence of any solid body of the kind in accordance with the invention.

Further characteristic features of the cooler in accordance with the invention can be appreciated from the accompanying sub-claims and from the following description of the accompanying drawing, in which FIG. 1 shows in perspective view one half of a cooler manufactured by the method to which the invention relates.

FIGS. 2a, 2b and 2c show in that order a spacer washer, a distance piece, and a part of a trough-shaped plate in a cooler in accordance with FIG. 1.

FIG. 4 is a partial longitudinal section through the half of a cooler shown in FIG. 1.

Figure 1:
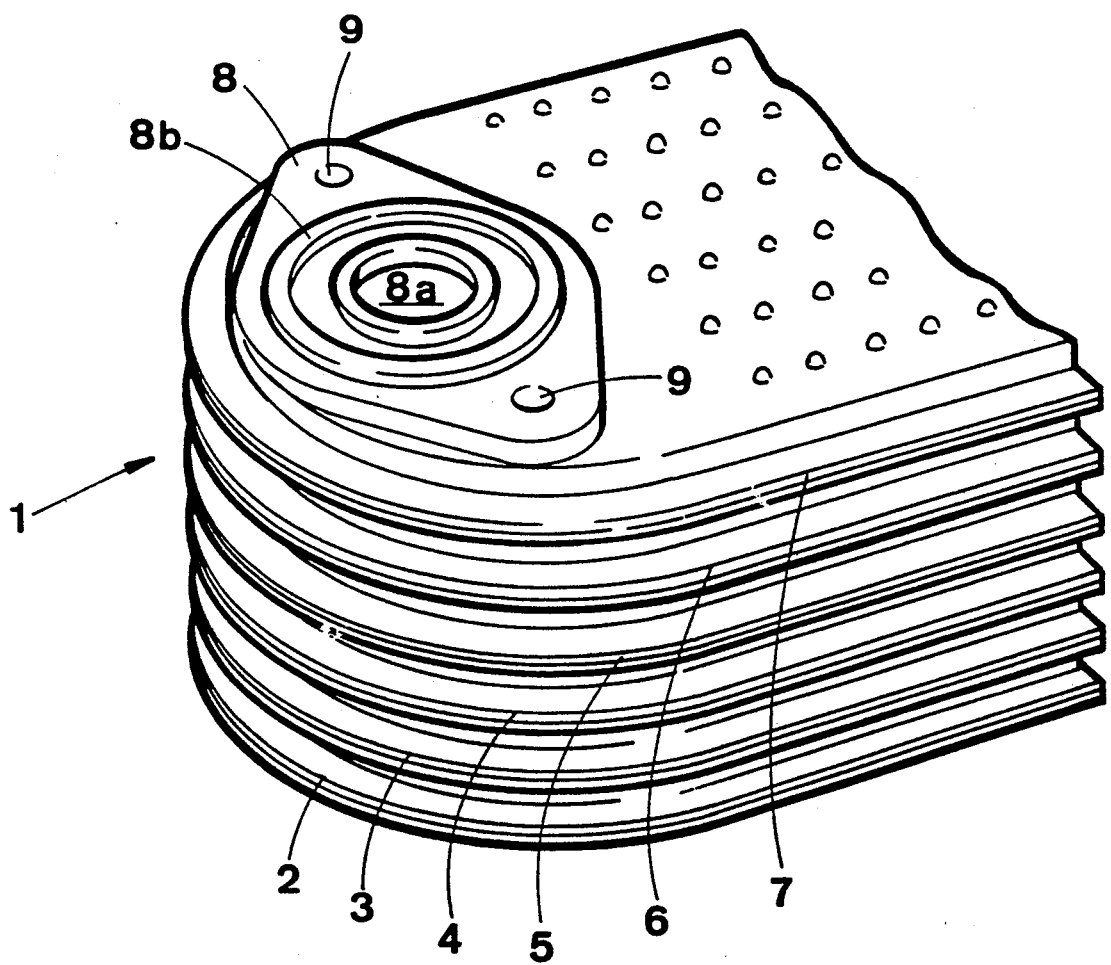

In the drawings, and especially in FIG. 1, the designation 1 is used generally with respect to a cooler with six passageways 2-7 for a fluid which is to be cooled, which passageways are arranged adjacent to one another and at a certain distance from one another. These are connected to one another in parallell and communicate with inlet and outlet connection sleeves 8 via collectors 8a. The sleeves 8 are executed in a common fashion and are provided with an annular groove 8b for a seal, for example an 'O'-ring. The fluid which is to be cooled thus passes via the inlet connection coupling 8, the collector 8a, the passageways 2-7, the corresponding collector and the outlet connection coupling, the latter two parts not being shown in the drawing. Each passageway 2-7 consists of two preferably rounded rectangular plates 2a, 2b . . . 7a, 7b, which are connected to one another in an airtight fashion, at least along their projecting and outward-folded edges 2a1, 2b1 . . . 7a1, 7b2. For the sake of clarity, only the plates 2a, 2b are shown in FIG. 3.

The ends of the plates 2a, 2b . . . 7a, 7b are provided with openings 2a2, 2b2 . . . 7a2, 7b2, see FIG. 2c, which form the collectors 8a in the finished cooler 1. The plates are joined together during manufacture by a process of furnace brazing. For the purposes of installing the cooler 1, channels 9 passing through same and through the coupling 8 are provided in accordance with the invention. During operation, a cooling fluid is assumed to flow into the gap-like spaces, identified by the designation 1b in FIG. 4, through the passageways 2-7 which are arranged at a certain distance from one another.

Reference is now made to FIG. 2 in order to explain in more detail a cooler 1 produced in accordance with the invention. In this Figure the designations 10 and 11 are used respectively for spacer washers and distance pieces, which are illustrated in detail in FIGS. 2a and 2b and are intended to be positioned in an area of the cooler 1 which is situated near the respective ends sides of the plates 2a, 2b . . . 7a, 7b. The form of the space washers/distance pieces 10, 11 matches the rounded ends of the plates 2a, 2b . . . 7a, 7b. The spacer washers 10 define the distance between two passageways arranged adjacent to one another, i.e. the gap-shaped space between the passageways 2 and 3, 3 and 4, and so on, intended for the cooling fluid. The distance pieces effect the filling of a space situated immediately adjacent to the respective end of the passageways 2-7. As will be appreciated from FIGS. 2a and 2b, the spacer washers 10 and the distance pieces 11 are executed with recesses 10a and 11a, which interact with the openings 2a2, 2b2 ... 7a2, 7b2 in the plates in order to form the collectors 8a. During the furnace brazing process, in which the plates 2a, 2b ... 7a, 7b are known to be joined to one another at least along their edges, the plates 2a, 2b ... 7a, 7b, the coupling 8 and the spacer washers and the distance pieces are also joined to one another in such a way that a solid body, generally designated 12, see FIG. 4, is formed on each end side of the cooler 1. The channels 9 are then made through this body, for example by conventional boring.

Figure 3:
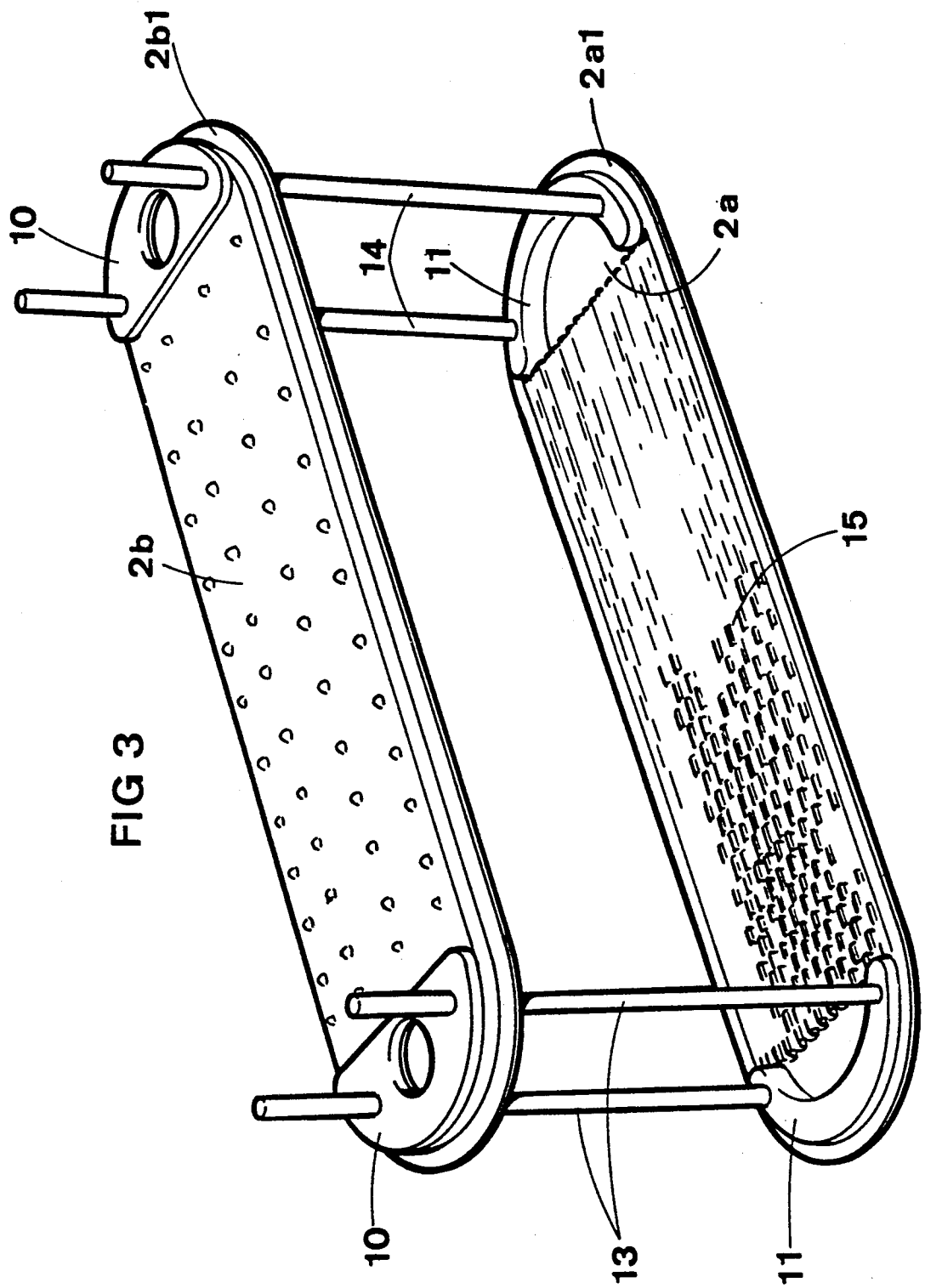
FIG. 3 shows in perspective view a diagrammatic representation of a preferred method of manufacturing a cooler in accordance with the invention.

Another preferred method in accordance with the invention for making the channels 9 will be appreciated from the following, with reference to FIG. 3: in conjunction with the pressing of the plates 2a, 2b ... 7a, 7b and the stamping out of the spacer washers and distance pieces 10, 11, these are executed with symmetrically arranged transcurrent holes 2a3, 2b3 ... 7a3, 7b3; 10b and 11b. The designations 13, 14 are used in respect of two pairs of mutually identical tubes, the external diameter of which is selected such that a sliding fit is obtained between the aforementioned transcurrent holes and the pairs of tubes 13, 14. During the manufacturing operation the tubes are arranged in an upright position, such that the plates 2a, 2b ... 7a, 7b and the spacer washers/distance pieces 10, 11 can be slid onto the tubes in the intended sequence. One starts in this case with a spacer 10 on each of the pairs of tubes 13, 14. These are then followed by the plate 2a, the distance piece 11, possibly a spacer body 15 designed to produce a predetermined type of flow in the chamber 2, the plate 2b, and then a further spacer 10, and so on. Once a predetermined number of chambers has been produced, a coupling 8 is finally slid over the respective pair of tubes 13, 14, whereupon the tubes are upset at their ends by a sufficient amount to ensure that the stacked plates and the spacer washers/distance pieces are held securely to the couplings, whereupon the furnace brazing operation takes place.

As already mentioned, the furnace brazing operation causes the plates 2a, 2b... 7a, 7b to be joined together along their edges 2a1, 2b1 ... 7a1, 7b1 with the respective spacer body 15 and in the respective area of the short sides of the cooler with the spacers and the distance pieces 10, 11 and the coupling 8 and the pairs of tubes 13, 14, to form a solid body 12. The tubes 13, 14 in this case form the channels 9 intended for the installation of the cooler.

We claim:

1. Method for the manufacture of a plate heat exchanger/cooler, which, in its finished state, exhibits a number of passageways communicating in parallel via collectors and intended for a fluid which is to be cooled, each and every one of which passageways consists of a pair of preferably rounded, rectangular plates executed with projecting and outward-folded edges and facing one another, with openings arranged on the ends, which, in the finished heat exchanger/cooler, constitute the aforementioned collectors, in conjunction with which, on the one hand, spacer washers which define flow openings for a cooling medium are present between pairs of plates situated adjacent to one another and, on the other hand, a distance piece is present between each pair of plates in an area on the respective end, whereby the spacer washers and the plates and the pairs of plates are joined together at least along their outward-folded edges by a furnace brazing process, characterized in that the spacer washers and the distance pieces are positioned in the same area, in that the aforementioned plates and spacer washers/distance pieces are caused by the furnace brazing process to form a solid body on each end of the heat exchanger/cooler, and in that before or after the furnace brazing process at least one transcurrent channel running across the plates and through these and the spacer washers/distance pieces is produced in the aforementioned area, which channel is intended to be utilized in conjunction with the installation of the heat exchanger/cooler.

2. Method in accordance with claim 1, characterized in that each distance piece and/or spacer washer is formed in such a way as to match the edge of the end of the plate and is executed with a recess which interacts with the aforementioned collector.

3. Method in accordance with claim 2, characterized in that the plates and the spacer washers/distance pieces are executed in conjunction with pressing and stamping out with two transcurrent holes positioned symmetrically relative to the openings and the recesses, in that during the manufacturing operation four tubes with an external diameter which permits a sliding fit in the aforementioned holes are arranged in an upright position, such that the plates and the spacer washers/distance pieces can be slid onto the tubes in the intended sequence, and in that once a predetermined number of plates and spacer washers/distance pieces has been stacked, the ends of the tubes are upset in order to ensure that the stacked plates and the spacer washers/distance pieces are held securely together, whereupon the furnace brazing operation takes place.

4. Method in accordance with claim 1, characterized in that the aforementioned transverse channels intended for installation with the heat exchanger/cooler are made by conventional boring.

5. Method in accordance with claim 1, characterized in that a connection coupling is fixed by the furnace brazing process to each collector on the outermost plate in question of the heat exchanger/cooler, and in that a spacer washer is fixed by the furnace brazing process to the respective end of the opposite plate.

6. Arrangement for a plate heat exchanger/cooler produced by furnace brazing, which has a number of passageways arranged adjacent to one another and at a certain distance from one another, with inlet and outlet connection couplings for a fluid which is to be cooled and communicating in parallel, between which a cooling fluid is intended to flow, each of which passageways consists of two preferably rounded rectangular trough-shaped plates, which are connected to one another in an airtight fashion, characterized in that distance pieces and spacer washers are present in an area on the respective ends of the passageways between the plates in each passage and between them, which distance pieces and spacer washers are caused during the furnace brazing operation to form a solid body together with the plates and the connection couplings, and in that there are present at each end two channels arranged preferably symmetrically relative to the opening of the coupling, situated perpendicular to the plane of the plates and passing through the aforementioned body, for the purpose of clamping the plate heat exchanger/cooler securely in position.

7. Arrangement in accordance with claim 6, characterized in that every aforementioned channel through the respective solid body consists of a tube which extends through the plates, the spacer washers/distance pieces and the respective coupling, and which is caused to become a part of the aforementioned body during the furnace brazing operation.

8. Method in accordance with claim 2, characterized in that the aforementioned transverse channels intended for the installation the heat exchanger/cooler are made by conventional boring.

9. Method in accordance with claim 2, characterized in that a connection coupling is fixed by the furnace brazing process to each collector on the outermost plate in question of the heat exchanger/cooler, and in that a spacer washer is fixed by the furnace brazing process to the respective end of the opposite plate.

10. Method in accordance with claim 3, characterized in that a connection coupling is fixed by the furnace brazing process to each collector on the outermost plate in question of the heat exchanger/cooler, and in that a spacer washer is fixed by the furnace brazing process to the respective end of the opposite plate.

11. Method in accordance with claim 4, characterized in that a connection coupling is fixed by the furnace brazing process to each collector on the outermost plate in question of the heat exchanger/cooler, and in that a spacer washer is fixed by the furnace brazing process to the respective end of the opposite plate.

* * * * *

UNITED STATES PATENT AND TRADEMARK OFFICE

CERTIFICATE OF CORRECTION

PATENT NO. : 5,184,673

DATED : February 9, 1993

INVENTOR(S) Hedman et al.

It is certified that errors appear in the above-identified patent and that said Letters Patent is hereby corrected as shown below:

On the front page of the patent add:

"[30] Foreign Application Priority Data
 Apr 28, 1989 [SE] Sweden ................................8901553-1"

Signed and Sealed this

Seventeenth Day of April, 2001

Attest:

NICHOLAS P. GODICI

*Attesting Officer*  *Acting Director of the United States Patent and Trademark Office*